United States Patent
Hsu

(10) Patent No.: US 7,580,419 B2
(45) Date of Patent: Aug. 25, 2009

(54) NETWORK SYSTEM INTEGRATED WITH SIP CALL SERVER AND SIP AGENT CLIENT

(75) Inventor: Hung Hsiang Hsu, Taipei (TW)

(73) Assignee: Zyxel Communications Corp, Hsinchu (TW)

( * ) Notice: Subject to any disclaimer, the term of this patent is extended or adjusted under 35 U.S.C. 154(b) by 956 days.

(21) Appl. No.: 10/778,034

(22) Filed: Feb. 17, 2004

(65) Prior Publication Data

US 2005/0180436 A1    Aug. 18, 2005

(51) Int. Cl.
*H04L 12/28* (2006.01)
*H04L 12/56* (2006.01)
*H04J 3/16* (2006.01)
*H04J 13/22* (2006.01)

(52) U.S. Cl. ............... 370/401; 370/395.5; 370/466; 370/469; 370/261

(58) Field of Classification Search ............ 370/401, 370/356, 352, 395.5, 466, 469
See application file for complete search history.

(56) References Cited

U.S. PATENT DOCUMENTS

| | | | |
|---|---|---|---|
| 6,252,944 B1 * | 6/2001 | Hansen et al. | 379/67.1 |
| 6,512,818 B1 * | 1/2003 | Donovan et al. | 379/88.18 |
| 6,615,236 B2 * | 9/2003 | Donovan et al. | 709/203 |
| 6,798,755 B2 * | 9/2004 | Lillie et al. | 370/312 |
| 6,823,050 B2 * | 11/2004 | Brown et al. | 379/93.21 |
| 6,842,449 B2 * | 1/2005 | Hardjono | 370/352 |
| 6,845,092 B2 * | 1/2005 | Vassilovski et al. | 370/342 |
| 6,965,614 B1 * | 11/2005 | Osterhout et al. | 370/466 |
| 7,012,888 B2 * | 3/2006 | Schoeneberger et al. | 370/217 |
| 7,283,519 B2 | 10/2007 | Girard | |
| 2001/0046237 A1 * | 11/2001 | Chan et al. | 370/419 |
| 2002/0101965 A1 * | 8/2002 | Elzur | 379/93.01 |
| 2002/0103898 A1 * | 8/2002 | Moyer et al. | 709/224 |
| 2002/0164003 A1 * | 11/2002 | Chang et al. | 379/93.05 |
| 2004/0234059 A1 * | 11/2004 | Lazarus et al. | 379/202.01 |

FOREIGN PATENT DOCUMENTS

WO    WO 0211400 A1 *    2/2002

* cited by examiner

*Primary Examiner*—Edan Orgad
*Assistant Examiner*—Blanche Wong

(57) ABSTRACT

A network system integrated with SIP call server and SIP agent client. The network system is provided between a local device and a network for connecting with at least one remote device. The network system includes: at least one local connecting port for coupling with the local device; a remote connecting port for coupling with the network; and an SIP processing module for executing at least one SIP call server program and SIP agent client program. After the local and remote devices perform SIP registry on the SIP call server program, the local and remote devices can telecommunicate with each other by voice from a private SIP telecommunication network. The network system further includes an IP phone connecting port for coupling with at least one IP phone and a voice processing module for converting the voice signal of the IP phone into digital signal and converting the digital signal of the SIP processing module into voice signal. By means of the IP phone, a user can directly telecommunicate with the remote device by voice without registering on external SIP call server.

16 Claims, 4 Drawing Sheets

NETWORK SYSTEM INTEGRATED WITH SIP CALL SERVER AND SIP AGENT CLIENT

BACKGROUND OF THE INVENTION

1. Technical Field

The present invention is related to a network system integrated with SIP call server and SIP agent client, and more particularly to a network system which is integrated with SIP call server and SIP agent client based on Session Initiation Protocol (SIP).

2. Description of the Prior Art

Many new techniques have been developed along with the popularity of advanced Internet. For example, voice over Internet protocol (VoIP) is proposed to provide voice telecommunication on IP network of LAN or Internet as using phone. This can save a great deal of calling fee. Such technique includes PC-to-PC telecommunication between two surfing computers, PC-to-phone telecommunication between a surfing computer and an ordinary phone via an integrated networked private branch exchange (PBX), phone-to-phone telecommunication between two phones via VoIP gateway of network telephone company for network digitalized conversion and device-to-device telecommunication between two IP phones.

The basic operation principle of VoIP is to transmit analog voice signal from a telephone, facsimile or PBX to a router for converting and compressing the voice signal into a data packet. The data packet is transmitted to a remote router via IP network. The remote router converts the data packet back into analog voice signal and then transmits the signal to the telephone, facsimile or PBX. Finally, the signal is sent to a user end. Accordingly, via the Internet, the remote telecommunication can be performed all over the world without using the conventional public telephone network (PSTN).

However, the existent VoIP technique such H323/H248, etc. regulated by International Telecommunication Union (ITU) is designed for local area network and is not fully applicable to the open environment of Internet. Moreover, the VoIP technique involves complicated structure and more strict limits. Therefore, the conversion between the existent VoIP technique and the PSTN is relatively complicated. In order to solve the above problems, Internet Engineering Task Force (IETF) has developed a new protocol, that is, Session Initiation Protocol (SIP). This protocol is fully applicable to the integrated environment of Internet and PSTN.

The SIP pertains to an application layer protocol in the seven-layer structure of open system interface (OSI) as the client-server structure of HTTP protocol. In packet processing, the commands and states can be transmitted in pure text by means of the read packet data of HTTP. Therefore, the SIP is very suitable for the transmission architecture of wide area network.

In the SIP structure, at least one SIP call server must be built in addition to the user agent (UA). The SIP call server can serve as a proxy server, redirect server, registry server, voice mail server, etc. The SIP call server is functionally an integrated software and can be combined with the existent PSTN, VoIP, etc.

However, in the SIP architecture, each UA must register one's own SIP URI and current IP location in the registry server, whereby the SIP call server can identify every UA. After registered, other UA on the Internet can communicate with the UA through the SIP call server.

In addition, the SIP pertains to application layer protocol so that the software can be easily developed independent to lower layer transmission or network. Therefore, the SIP can be built on various networks or servers. Also, it is very easy to integrate the respective systems. For example, the SIP can be integrated with the internal server, database, WWW website, chat room or video meeting system of a corporation. Alternatively, the SIP can be integrated with external PSTN or VoIP.

It can be known from the above that the SIP is advantageous with easy integration and reduced telecommunication fee. Therefore, a company can utilize the internal broad band and external broad band network between the headquarter and branches to build the SIP telecommunication network. Accordingly, the remote telecommunication fee or international telecommunication fee between the headquarter and the remote branches or oversea branches can be reduced.

The basic architecture of the SIP includes at least one SIP call server, at least one local user agent client of VoIP and at least one remote user agent client of IP phone. Therefore, presently, when building the SIP telecommunication network, it is still necessary to register on the external SIP call server. This is inconvenient. Moreover, in the case that there are a number of registered users, the user still needs to afford the fees for the registry and bridge telecommunication.

Therefore, the applicant is intended to develop a network apparatus integrated with SIP call server and SIP agent client. The SIP call server and the SIP agent client are integrated with a broad band network apparatus such as ADSL modem, network hub, wireless LAN access point, IP sharer, etc. By means of the present invention, a user by oneself can build a private SIP telecommunication network to eliminate the troublesome registration on external SIP call server. In addition, the cost for building the SIP call server is saved and the telecommunication fee is greatly reduced.

SUMMARY OF THE INVENTION

It is therefore a primary object of the present invention to provide a network system integrated with SIP call server and SIP agent client. A user by oneself can build a private SIP telecommunication network. By means of the network system, the user can telecommunicate with the IP phone of at least one remote user by voice without registering on external SIP call server. Therefore, the telecommunication fee is greatly reduced.

According to the above object, the network system of the present invention is provided between a local device and a network for connecting with at least one remote device. The network system includes at least one local connecting port for coupling with the local device, a remote connecting port for coupling with the network; and an SIP processing module for executing at least one SIP call server program and SIP agent client program. After the local and remote devices perform SIP registry on the SIP call server program, the local and remote devices can telecommunicate with each other by voice without registering on external SIP call server.

The network system further includes at least one IP phone connecting port for coupling with at least one IP phone; and a voice processing module coupling with the SIP processing module for converting the analog voice signal of the IP phone into digital signal and converting the digital signal of the SIP processing module into voice signal. Accordingly, a user can directly use the local IP phone to telecommunicate with the IP phone of a remote user by voice.

The present invention can be best understood through the following description and accompanying drawings wherein:

DETAILED DESCRIPTION OF THE PREFERRED EMBODIMENTS

Figure 1:
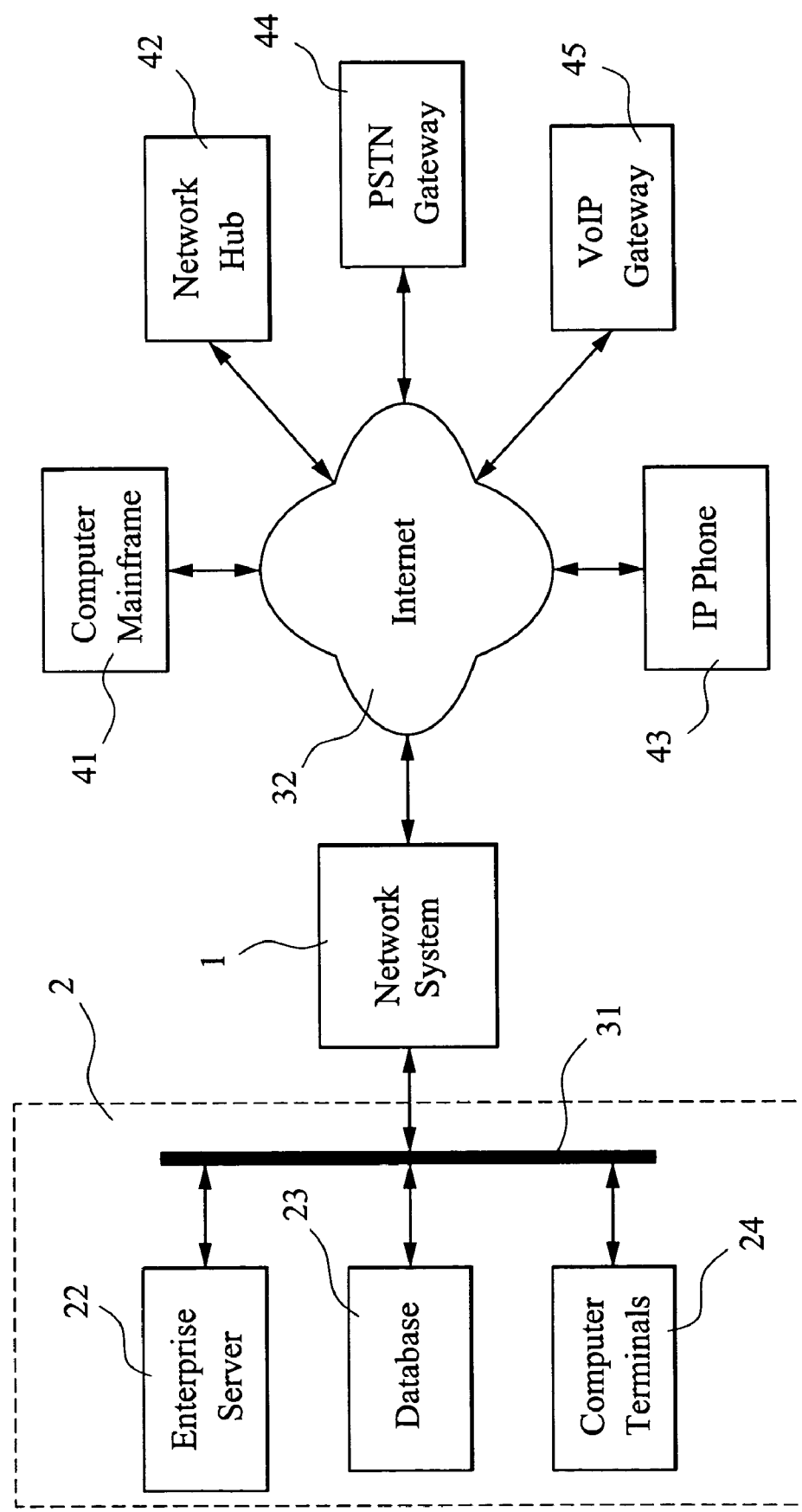
FIG. 1 is a block diagram of the structure of the SIP telecommunication network of the present invention.

FIG. 1 is a block diagram of the structure of the SIP telecommunication network of the present invention. The network system 1 of the present invention is integrated with hardware and software structure of SIP call server and SIP agent client, best shown in FIG. 3. The network system 1 is provided between a local device 2 and a network. The network system 1 can be integrated with an internal LAN or Intranet 31 of an enterprise for connecting with the server 22, database 23 and computer terminals 24 of the enterprise. The network system 1 can be also connected to external WAN (such as Internet) 32. The network system 1 can be an ADSL modem, a cable modem, a wireless LAN access point, a network hub or an IP sharer to connect with at least one remote device 4 for telecommunication.

The local device 2 and the remote device 4 both can be computer 41, network hub 42 for connection between respective computers, IP phone 43 connected with computers, PSTN gateway 44, VoIP gateway 45, etc. The PSTN 44 can be connected with at least one telephone, facsimile or PBX. The VoIP gateway 45 can be connected with at least one VoIP phone.

Figure 2:
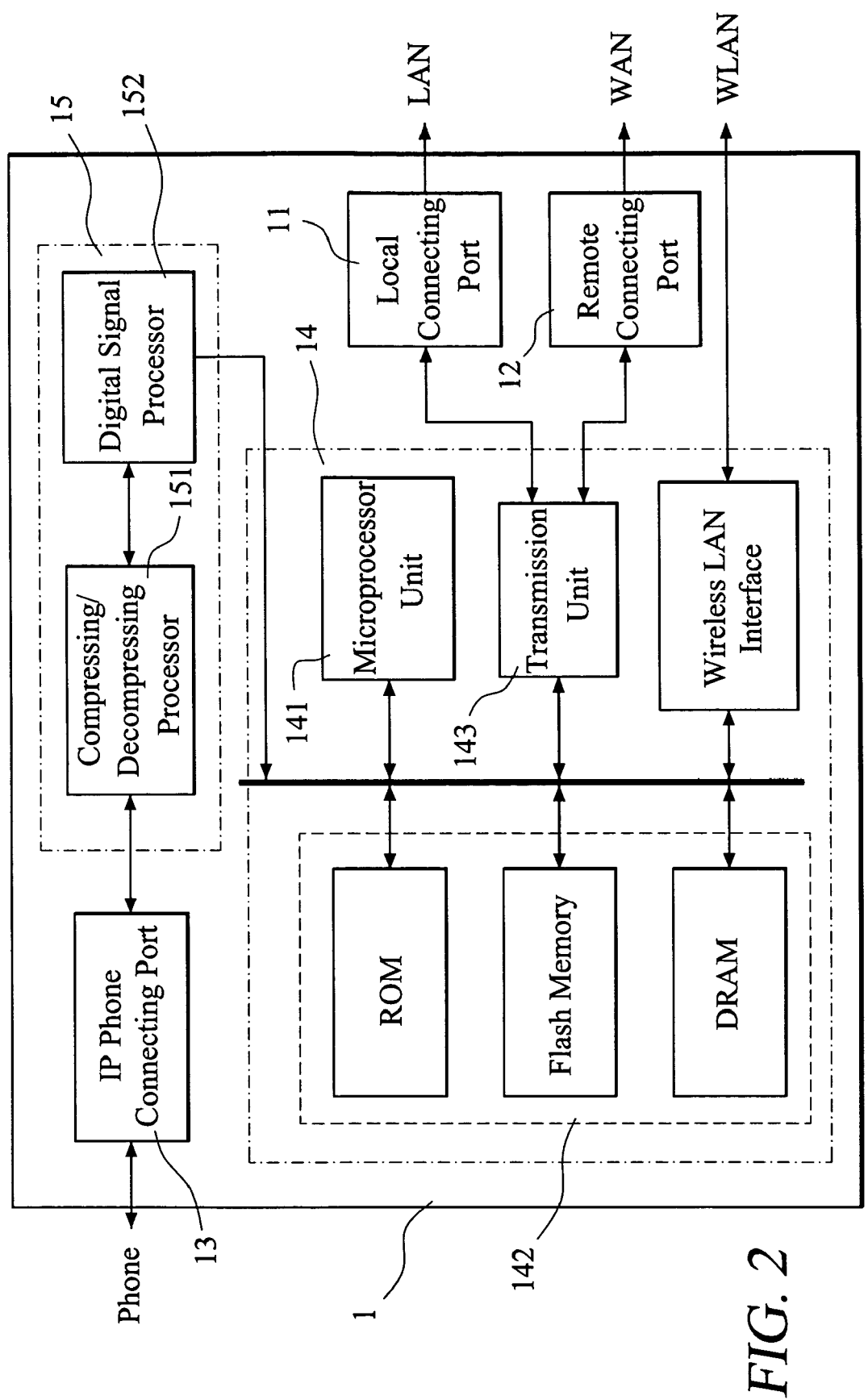
FIG. 2 is a block diagram of the internal structure of the network system of the present invention.

FIG. 2 is a block diagram showing the internal structure of the network system of the present invention. The network system 1 has at least one local connecting port 11, a remote connecting port 12 and at least IP phone connecting port 13. An SIP processing module 14 and a voice processing module 15 are provided in the network system 1. The local connecting port 11 can be coupled with the local device 2 or internal LAN 31 via transmission wire (such as RJ/45 Ethernet wire). The remote connecting port 12 can be coupled with the Internet 32. The IP phone connecting port 13 is used to couple with at least one IP phone.

The SIP processing module 14 is electrically connected to the local connecting port 11 and the remote connecting port 12. The SIP processing module 14 is able to via the local connecting port 11 control the signal transmission of the data package between the network apparatus 1 and the local device 2. Also, the SIP processing module 14 is able to, via the remote connecting port 12, control the signal transmission of the data package between the network system 1 and the Internet 32.

The voice processing module 15 is electrically connected with the IP phone connecting port 13 and the SIP processing module 14. The voice processing module 15 is able to convert the analog voice signal generated by the IP phone into digital signal and send the digital signal to the SIP processing module 14. The voice processing 15 is able to convert the digital signal sent from the SIP processing module 14 into voice signal and send the voice signal to the IP phone. Therefore, by means of the IP phone, a user can directly communicate with the remote device by voice.

The SIP processing module 14 is mainly composed of a microprocessor unit 141, a memory unit 142 and a plurality of transmission units 143. The microprocessor unit 141 mainly serves to execute SIP call server program and SIP agent client program. The memory unit 142 is electrically connected with the microprocessor unit 141. The memory unit 142 includes an ROM for storing the SIP call server and agent client program to be executed, a DRAM for temporarily storing the transmitted data; and a flash memory for storing the SIP URI of every user.

The transmission units 143 are used to bridge the digital signal between the local connecting port 11 (or the remote connecting port 12) and the microprocessor unit 141. The transmission unit 143 can be a broad band modem interface such as ADSL modem for connecting with a WAN 32. Alternatively, the transmission unit 143 can be an Ethernet interface for connecting with the local device 2 or LAN 31. Still alternatively, the transmission unit 143 can be a wireless LAN interface such as IEEE 802.11 for wirelessly connecting with a wireless LAN card.

The voice processing module 15 is mainly composed of a compressing/decompressing processor 151 and a digital signal processor (DSP) 152. The compressing/decompressing processor 151 is electrically connected to the IP phone connecting port 13 for compressing the voice signal sent from the IP phone or decompressing the voice signal and transmitting the voice signal to the IP phone. The digital signal processor 152 is electrically connected to the compressing/decompressing processor 151 and the SIP processing module 14 for converting the analog voice signal into digital signal or converting the digital signal into analog voice signal.

Figure 3:
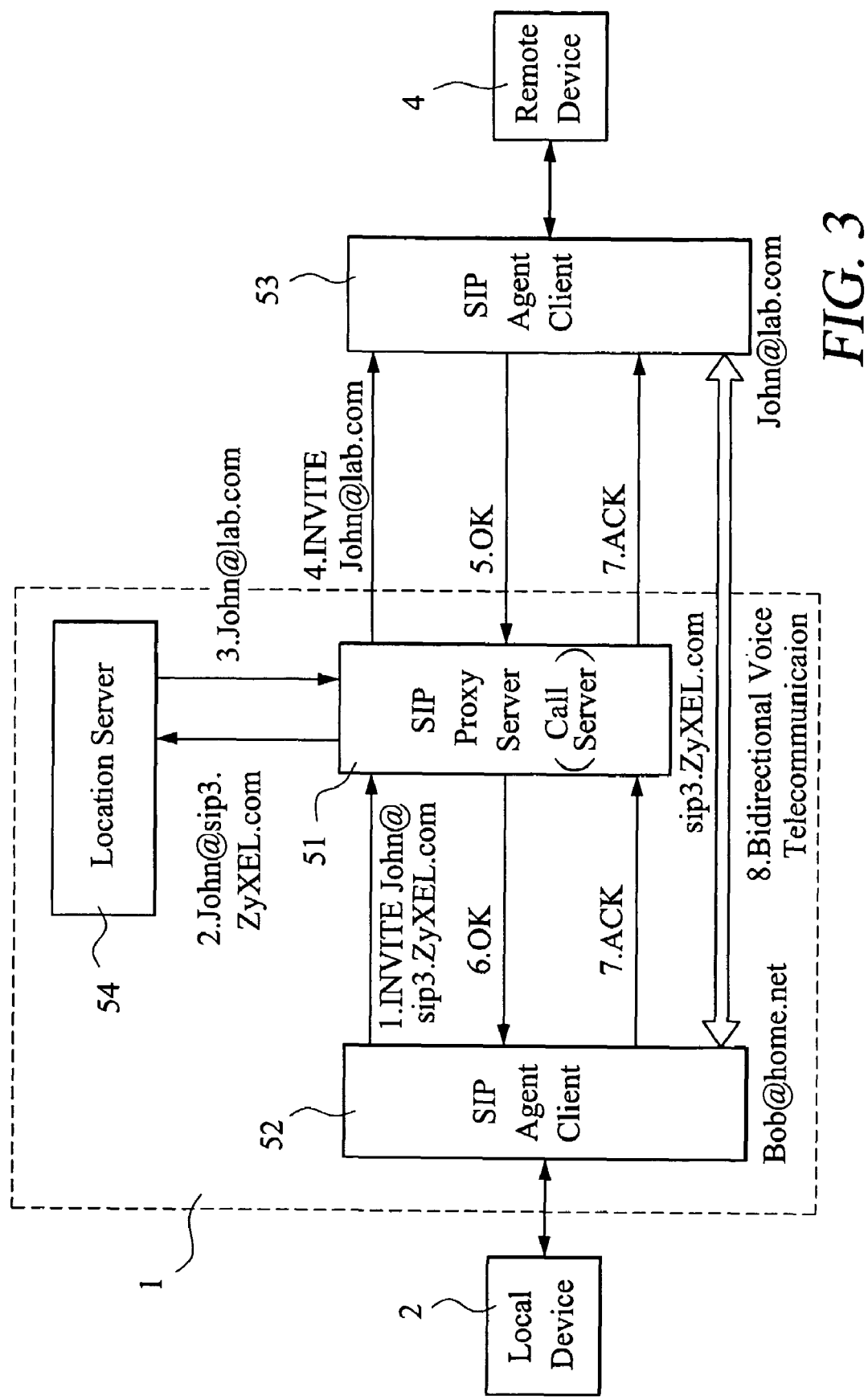
FIG. 3 shows the SIP telecommunication state of the present invention.
Figure 4:
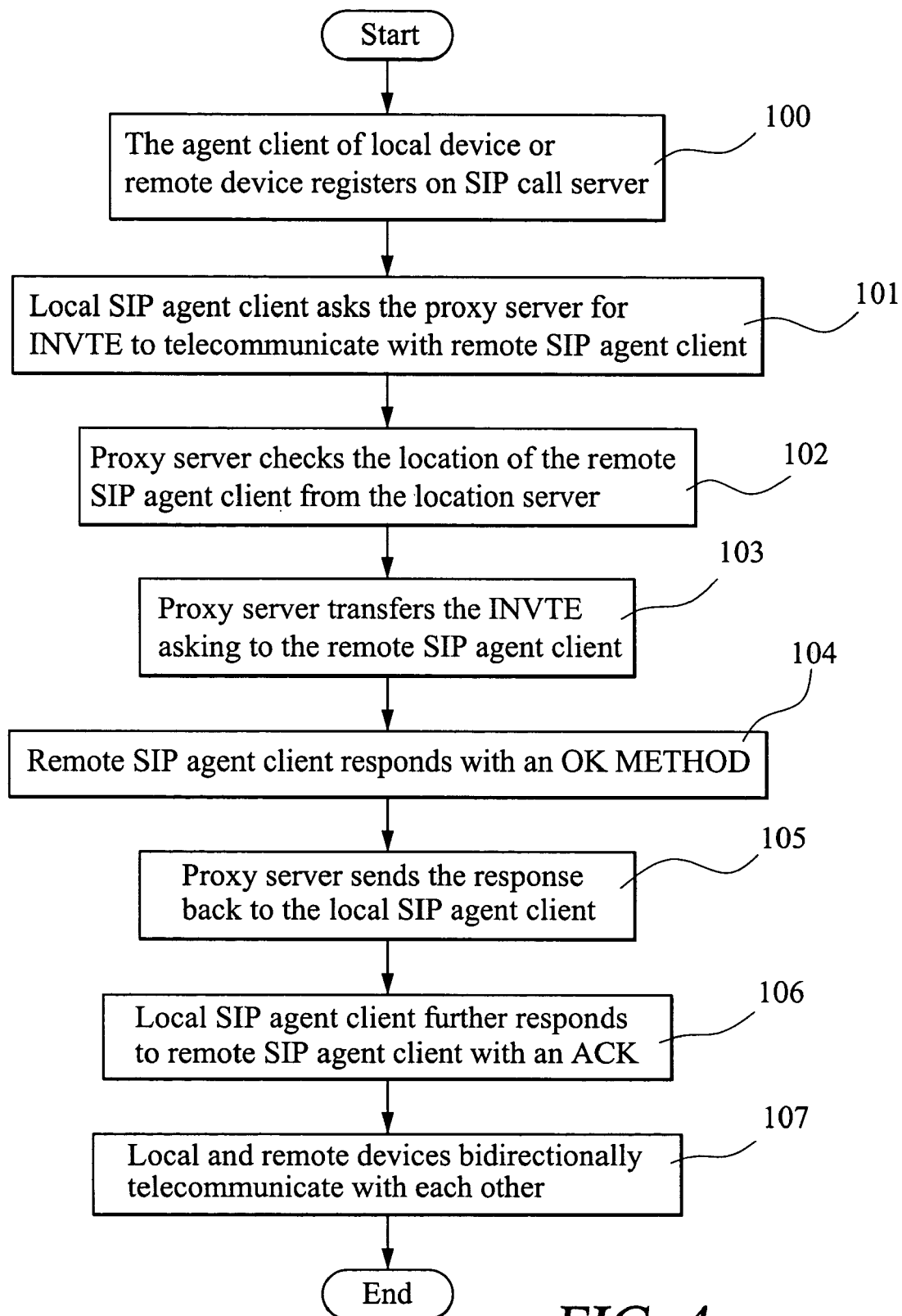
FIG. 4 is a flow chart of the SIP telecommunication of the present invention.

FIG. 3 shows the SIP telecommunication state of the present invention. FIG. 4 is a flow chart of the SIP telecommunication of the present invention. The SIP processing module 14 of the present invention mainly includes an SIP call server 51 and an SIP agent client 52. The SIP call server 51 executes at least one SIP call server program for the local device 2 and the remote device 4 to perform SIP registry, whereby the local device 2 and the remote device 4 can perform voice telecommunication. The SIP call server program can be proxy server program, registry server program, location server program, redirect server program, voice mail server program, etc. Different servers can be combined according to required functions.

The SIP agent client 52 executes at least one SIP agent client program or is directly connected with an IP phone for compressing and converting the voice signal of the local device 2 into digital signal or decompressing and converting the digital signal into voice signal to telecommunicate with the remote device 4 by voice.

Before performing telecommunication by voice, both the local device 2 and the remote device 4 must first, via the SIP agent clients 52 and 53, register their own SIP URI and IP location on the SIP call server 51 in step 100. The SIP URI is the only way for the SIP call server 51 to identify every SIP agent clients 52, 53. For demonstration, after registered the SIP URI of the SIP agent client 52 of the local device 2 is assumned to be Bob@sip3.ZyXEL.com, while the SIP URI of the SIP agent client 53 of the remote device 4 is assumed to be John@sip3.ZyXEL.com.

When the local SIP agent client 52 wants to telecommunicate with the remote SIP agent client 53, the local SIP agent client 52 first asks the proxy server of the SIP call server 51 for INVITE (step 101). The proxy server will check the location of the remote SIP agent client from the location server 54 of the SIP call server 51. After the proxy server 51 identifies the location of the remote SIP agent client 53 (102), the INVITE asking is transferred to the remote SIP agent client 53 (step 103).

After the remote SIP agent client 53 receives this asking, if agreeing to telecommunicate with the local SIP agent client 52, the remote SIP agent client 53 will respond with an OK METHOD (step 104). After the proxy server receives the response, the proxy server will send the response back to the local SIP agent client 52 (step 105). At this time, the local SIP agent client 52 will further respond to the remote SIP agent client 53 with an ACK to indicate reception of "OK" (step 106). Then, the user of the local device 2 of the local SIP agent client 52 can bidirectionally telecommunicate with the user of the remote device 4 of the remote SIP agent client 53 by voice (step 107).

The above embodiments are only used to illustrate the present invention, not intended to limit the scope thereof. Many modifications of the above embodiments can be made without departing from the spirit of the present invention.

What is claimed is:

1. A telecommunication network for communication between a local device and at least one remote device, comprising:
    a network system integrated with an SIP call server and an SIP agent client of a local device, the network system being based on the Session Initiation Protocol (SIP) structure and being provided between the local device and a network for connecting with an SIP agent client of at least one remote device, wherein said network system includes:
    at least one local connecting port for coupling with the local device;
    a remote connecting port for coupling with the network; and
    an SIP processing module electrically connected with the local connecting port and remote connecting port to execute at least one SIP agent client program and at least one SIP call server program, the SIP processing module including:
    said SIP agent client of the local device converting an analog voice signal of the local device into a digital signal and sending the digital signal to the SIP agent client of said at least one remote device, and converting a digital signal sent from the SIP agent client of said at least one remote device into an analog voice signal and sending the analog voice signal to the local device; and
    said SIP call server, said SIP call server being based on an SIP structure and being operatively coupled between said SIP agent client of the local device and said SIP agent client of said at least one remote device, wherein after said SIP agent client of the local device and said SIP agent client of said at least one remote device perform SIP registry and the locations of said SIP agent client of the local device and said SIP agent client of said at least one remote device are linked, said SIP agent client of the local device and said SIP agent client of said at least one remote device bidirectionally telecommunicate with each other by voice.

2. The telecommunication network as claimed in claim 1, wherein the local device is a computer mainframe, a network hub, an IP phone or a PSTN gateway.

3. The telecommunication network as claimed in claim 2, wherein the PSTN gateway is connected with at least one telephone, facsimile or PBX.

4. The telecommunication network as claimed in claim 1, wherein the network is an LAN or Internet.

5. The telecommunication network as claimed in claim 1, wherein the remote device is a computer, a network hub, an IP phone, a PSTN gateway or a VoIP gateway.

6. The telecommunication network as claimed in claim 5, wherein the PSTN gateway is connected with at least one telephone, facsimile or PBX.

7. The telecommunication network as claimed in claim 5, wherein the VoIP gateway is connected with at least one VoIP phone.

8. The telecommunication network as claimed in claim 1, wherein the SIP processing module via the local connecting port controls the transmission of the data packet between the network system and the local drive.

9. The telecommunication network as claimed in claim 1, wherein the SIP processing module via the remote connecting port controls the transmission of the data packet between the network system and the network.

10. The telecommunication network as claimed in claim 1, wherein the hardware structure of the SIP processing module includes:
    a microprocessor unit for executing the SIP call server program and SIP agent client program;
    a memory unit electrically connected with the microprocessor unit for storing the SIP call server and agent client program to be executed, the transmitted data and the SIP URI of every client; and
    a plurality of transmission units used to bridge the local connecting port or the remote connecting port and the microprocessor unit for transmitting the data packet.

11. The telecommunication network as claimed in claim 10, wherein the memory unit is an ROM, a DRAM or a flash Memory.

12. The telecommunication network as claimed in claim 10, wherein the transmission unit is a broad band modem interface, an Ethernet interface or a wireless LAN interface.

13. The telecommunication network as claimed in claim 1, wherein the SIP call server program is proxy server program, registry server program, location server program, redirect server program or voice mail server program.

14. The telecommunication network as claimed in claim 1, further comprising:
    at least one IP phone connecting port for coupling with at least one IP phone; and
    a voice processing module electrically connected with the IP phone connecting port and the SIP processing module, the voice processing module serving to convert the voice signal of the IP phone into digital signal and convert the digital signal of the SIP processing module into voice signal, whereby by means of the IP phone, a user can directly telecommunicate with the remote SIP agent client by voice.

15. The telecommunication network as claimed in claim 14, further comprising:
    a compressing/decompressing processor electrically connected to the IP phone connecting port for compressing/decompressing the voice signal; and
    a digital signal processor electrically connected to the compressing/decompressing processor and the SIP processing module for converting the voice signal into digital signal or converting the digital signal into voice signal.

16. A telecommunication network for communication between an IP phone and at least one remote device, comprising:
    a network system integrated with an SIP call server and an SIP agent client of a local device, the network system being based on the Session Initiation Protocol (SIP) structure, the network system being connected between the local device and a network for connecting with an SIP agent client of at least one remote device, wherein said network system is selected from a group consisting of:

an ADSL modem, a cable modem, a wireless LAN access point, and an IP sharer, and wherein the network system includes:

at least one local connecting port for coupling with the local device, a remote connecting port for coupling with the network, an SIP processing module disposed in the network system and electrically connected with the local connecting port and remote connecting port to execute at least one SIP agent client program and at least one SIP call server program, at least one IP phone connecting port for coupling with at least one IP phone, and a voice processing module electrically connected with said IP phone connecting port and said SIP processing module, the voice processing module converting an analog voice signal of the IP phone into a digital signal, or converting the digital signal of the SIP processing module into an analog voice signal, wherein the SIP processing module includes:

said SIP agent client of the local device coupled to said voice processing module, and said SIP call server, said SIP call server being based on an SIP structure and being operatively coupled between said SIP agent client of the local device and said SIP agent client of said at least one remote device, wherein after the SIP agent client of the local device and the SIP agent client of said at least one remote device perform SIP registry and the locations of the SIP agent client of the local device and the SIP agent client of said at least one remote device are linked by said SIP call server, a user, by means of the IP phone, communicates with said SIP agent client of said at least one remote device by voice.

* * * * *